US009609980B2

(12) United States Patent
Prieto Dominguez

(10) Patent No.: US 9,609,980 B2
(45) Date of Patent: Apr. 4, 2017

(54) DEMOUNTABLE AND PORTABLE ELECTRIC ROTATING SPIT GRILL

(71) Applicant: Soluciones de Diseno Integral S.A., Santiago (CL)

(72) Inventor: Jorge Eduardo Prieto Dominguez, Santiago (CL)

( * ) Notice: Subject to any disclaimer, the term of this patent is extended or adjusted under 35 U.S.C. 154(b) by 374 days.

(21) Appl. No.: 14/209,951

(22) Filed: Mar. 13, 2014

(65) Prior Publication Data

US 2015/0101493 A1 Apr. 16, 2015

(30) Foreign Application Priority Data

Oct. 14, 2013 (CL) .................................. 2969-2013

(51) Int. Cl.
*A47J 37/04* (2006.01)
*A47J 37/07* (2006.01)

(52) U.S. Cl.
CPC ......... *A47J 37/041* (2013.01); *A47J 37/0745* (2013.01)

(58) Field of Classification Search
CPC ..... A47J 37/041; A47J 37/042; A47J 37/0745
USPC ..... 99/419, 421 A, 421 H, 421 HH, 421 HV, 99/421 R
See application file for complete search history.

(56) References Cited

U.S. PATENT DOCUMENTS

| | | | | |
|---|---|---|---|---|
| 2,486,345 A * | 10/1949 | Triulzi | ................... | A47J 37/041 99/421 HV |
| 2,522,223 A * | 9/1950 | Hardin | ................ | A47J 37/0763 126/30 |
| 3,296,955 A | 1/1967 | Schaniel | | |
| 3,387,555 A * | 6/1968 | Moran | ................... | A47J 37/041 99/394 |
| 3,483,816 A * | 12/1969 | Lombardi | ............... | A47J 33/00 126/30 |
| 3,745,910 A * | 7/1973 | Delamater | .............. | A47J 43/18 99/419 |
| 4,083,354 A * | 4/1978 | Claire | ................. | A47J 37/0772 126/25 A |
| 4,815,367 A * | 3/1989 | Hanson | ............... | A47J 37/0745 99/421 H |
| 6,419,536 B1 | 7/2002 | Oguma | | |

(Continued)

FOREIGN PATENT DOCUMENTS

| | | |
|---|---|---|
| CA | 1310200 A1 | 11/1992 |
| CN | 202811883 U | 3/2013 |

OTHER PUBLICATIONS

International Search Report and Written Opinion in related International patent application No. PCT/CL2014/000053, mailed Apr. 15, 2015, 6 pages.

*Primary Examiner* — Reginald L Alexander
(74) *Attorney, Agent, or Firm* — Law Office of Jeff Williams; J. Oliver Williams

(57) ABSTRACT

The invention relates to a demountable electric rotating spit grill, which is designed to be installed and flexibly adjusted over any heating source, and at the same time, is suitable for installation on any type of surface in which the heating source can be generated. The purpose of the inventive electric rotating spit grill has been focused on satisfying the basic needs of the user when cooking any type of food on the grill or barbeque; therefore it is especially attractive for its transportability and portability, as it is completely demountable and easily of assembling at any place where it will be used.

13 Claims, 10 Drawing Sheets

(56) References Cited

U.S. PATENT DOCUMENTS

| | | | |
|---|---|---|---|
| 8,087,352 B2* | 1/2012 | Thompson | A47J 37/041 99/419 |
| 9,003,961 B2* | 4/2015 | Snow | A47J 37/041 126/25 A |
| 2003/0116684 A1 | 6/2003 | Rotondi | |
| 2015/0090129 A1* | 4/2015 | Kaefer | A47J 37/049 99/421 R |

* cited by examiner

DEMOUNTABLE AND PORTABLE ELECTRIC ROTATING SPIT GRILL

FIELD OF THE INVENTION

The present invention relates to domestic and patio/outdoor articles or appliances, more particularly involves a portable, rotating, electric spit grill with movably mounted food supports or with movable heating implements, including spits or skewers which support the food rotating in a horizontal axis.

Specifically the invention involves a demountable and portable electric rotating spit grill, which is designed to be easily installed in any place and adjusted over any heating source like wood, coal, gas or an electrical heating source, and at the same time, is suitable for installation on any type of surface in which the heating source can be generated, such as grass, soil, cement, or stone.

The purpose of the inventive electric rotating spit grill focuses on satisfying the basic needs of the user when cooking any type of food on the grill or barbeque, therefore it is especially attractive for being completely demountable, portable, easy to assemble and to clean at the place where it will be used and has a feature which leaves the meat perfectly cooked due to its rotating nature.

BACKGROUND OF THE INVENTION

When people gathers for barbeque or outdoor cooking event, there should always be one person designated to be in charge of the grill (i.e. someone responsible for making sure the meat doesn't overcook or burn). This job, even when is enjoyable by some people, brings with it the inconvenience of limiting the participation of said person in the rest of the activities that are going on.

Additionally, since this is a manual job, the meat often stays on one side for a long time, which leaves the meat dry, and cooked unevenly.

Because of this, the necessity arises of finding some solutions that aid in obtaining consistent results for perfectly cooked and more appetizing meat, and allow more freedom to the person in charge of the grill. Thus, this rotatory spit grill emerges as a solution for people in gaining independence during this recreational activity without compromising the quality of the food or the result.

Additionally due to its high portability and ease of assembly the invention is a real solution for people looking to celebrate a barbeques outside of home, in outdoor spaces or in places not previously considered because the lack of infrastructure or implements.

The previous art is characterized by rotating grills that work on several axes, where the motor drives a shaft that connects to another and so on, making the shaft containing foods to rotate over the fire or heat source.

The Document GB2083343 describes a spit consisting of two vertical support bars and a central horizontal bar over the vertical supports, the spit is operated by an electric motor that allows the horizontal bar to rotate, and said motor is externally located on one of the vertical bars. The horizontal bar has a piece that crosses it, which allows two shorter, blade-like parallel bars to be placed on it, which are located on each side of the central horizontal bar.

Document U.S. Pat. No. 6,508,167 describes a spit as consisting of a central horizontal bar that has two prongs, parallel to the central bar, at each one of its ends, which have points directed toward the center of said horizontal bar. On one end of the central horizontal bar the spit has a motor concealed under a cylindrical segment. The horizontal bar, together with its motor are supported over a rectangular container in which is used to put the charcoal.

Document GR1005092 describes a whole-lamb spit having a horizontal base and a vertical support and an element that allows a motor to move up and down, in order to put it over the prong so that this rotates. The prong is placed vertically and the motor fits on the top part. On the bottom part of the prong, a horizontal base is installed.

The patent application WO2004/078013 describes a prong that has an internal battery to move the front part of the prong. The prong can be taken apart into several parts and placed over any grill that has a support to hold it up.

In all these documents of prior art, spits are described as having a motor in order that the prongs or skewers (where the meat or food is placed) can rotate on its own axis. However, these spits have additional pieces located separately, not only for operatively connecting the motor to the rotating prong or skewer on which the meat or food is placed, but also for temporary fixing the bar that support the meat or food to the main axis of the spit, in a flexible way that allows food to be close enough to the heat source or fire according to its needs.

Therefore, one objective of the present invention is to provide an electric rotating spit grill that is compact and light in weight and consequently easily transportable, as well as simply mountable/demountable before and after its use.

Moreover, another objective of the present invention is to have an electric rotating spit grill that has an enhanced, useful and innovative design allowing it to hold its own weight (in addition to the weight of food) over the fire with no need of a vertical support at the free ends of the prongs or skewers when rotating or in use.

SUMMARY OF THE INVENTION

The demountable electric rotating spit grill (1), of the present invention comprises the following elements:
  a central pillar (4);
  a holder arm (5) fixed to the central pillar (4) by a fixing means (2) consisting in a sole piece with a particular shape;
  a piece (3) containing a coupling bar (16) connected to the holder arm (5) and having at the opposite end at least one prong;
  a geared motor (10) included inside of the holder arm (5), which also contains all its related elements located in line one in respect to the other; and
  an energy source (74) operatively connected to the geared motor of the holder arm (5).

In one preferred embodiment of the present invention, the central pillar (4) of the demountable electric rotating spit grill (1) is a hollow tube having two parts, one upper part (13) and one lower part (14), said lower part (14) that is mounted inside the upper part (13) through a connecting portion (12) located in one of its ends of smaller diameter respecting the diameter of the upper part (13) central pillar (4).

In another preferred embodiment of the present invention, the piece (3) has a plurality of prongs (17, 18) with free ends where the meat is inserted, said prongs disposed in parallel by means of an X shaped piece (15) which is formed by the union of two half-octagon-shaped pieces (6) inversely joined at the end of the coupling bar (16).

In an even another preferred embodiment, the piece (3) holds preferably two prongs, more preferably four parallel cylindrical prongs with free ends, of which the two nearest

(18) are smaller in diameter and size than the two located more distant (17), and said prongs (17, 18) have a male thread at the opposite end of their picks, through which the prongs (17,18) are fixed to the X shaped piece (15) which has two hollows which are located at the two free ends (23, 24) of each half-octagon piece (6), and the hole (21) of each end (23) has an opening that allows the passage of each prong while the hole (21) of each end (24) has an opening that has female threads onto which the prongs are screwed.

In another preferred embodiment of the invention, the coupling bar (16) connected to the holder arm (5) has, in one of its ends, a first cylindrical perforation (20) including a magnet (19), and a second perforation (9) which is placed perpendicularly in respect to the first cylindrical perforation (20) and including a prisoner screw, while in the opposite end said coupling bar (16) has soldered the X shaped piece (15).

In another more preferred embodiment of the invention the holder arm (5) comprises inside a hexagonal male bar (25) which enters into the coupling bar (16) through its first cylindrical perforation (20) and said hexagonal male bar (25) is connected in line to the geared motor (10) through a flexible connector (31) which has helicoids surrounding said hexagonal male bar (25).

The holder arm (5) comprises also two identical hollow sharpened bushings (26), one outer in the end of the holder arm, and the other inner alongside to the hexagonal male bar (25).

The geared motor (10) in the holder arm (5) of the inventive demountable electric rotating spit grill (1) is surrounded by an insulating element (73), and is operatively connected to the energy source (74) through a female Jack DC connector (76) and two copper cables (77,78). The energy source is any source that can be transformed to DC voltage, such as a set of alkaline batteries, a car battery, a solar panel, a domestic electric output, etc.

Another object of the present invention consists in the fixing means used in the demountable electric rotating spit grill (1), which is used for connecting both tubes (central pillar and holder arm) with the desired angle comprising a sole piece with a particular shape (2) similar to an infinite symbol, which contains two central in line elliptical perforations of different diameters, one corresponding to the diameter of one tube and the other one corresponding to the diameter the other tube, both elliptical perforations containing about 1 mm gap in both ends of their minor axis and through which both tubes are fixed with a specific angle between them.

BRIEF DESCRIPTION OF THE DRAWINGS

The invention will be described with references to the drawings attached in order to provide better understanding of the invention.

DETAILED DESCRIPTION OF THE INVENTION

Figure 1:
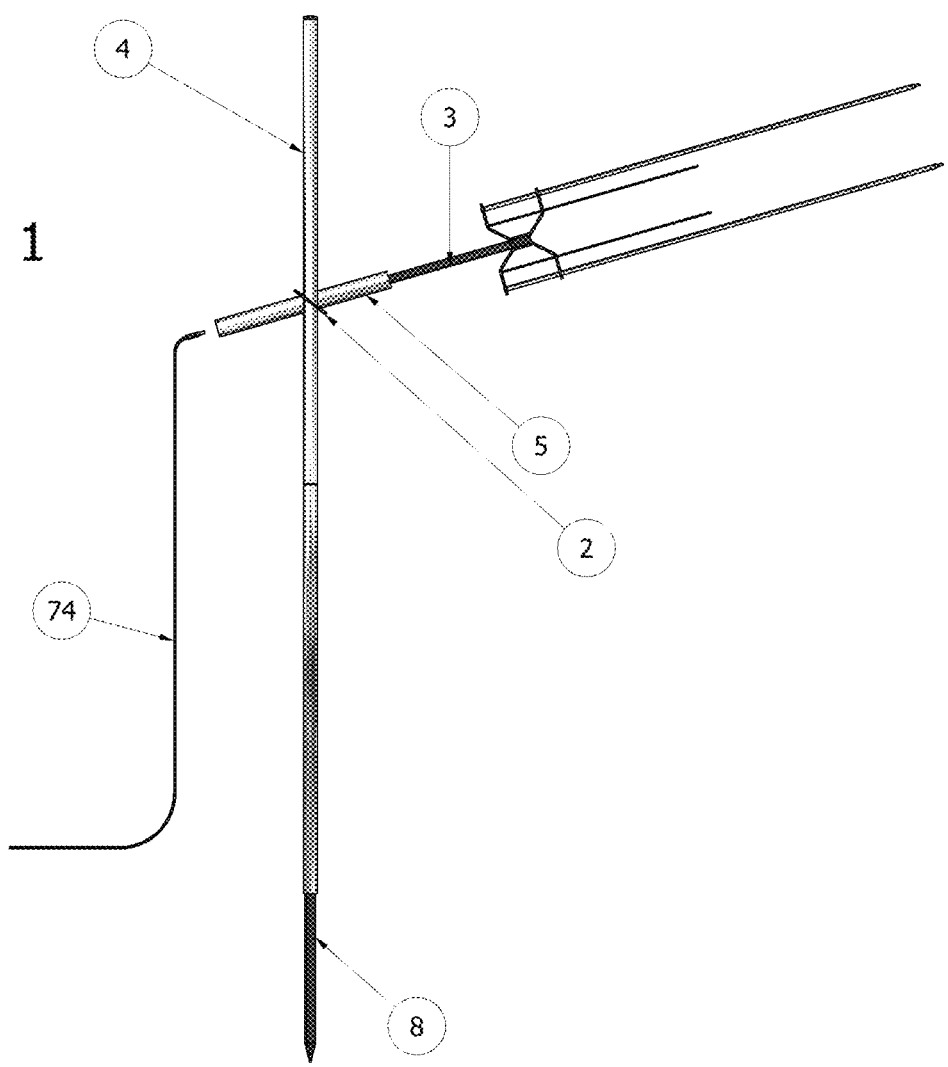
FIG. 1 corresponds to a frontal view of the demountable electric rotating spit grill (1) of the present invention when assembled in the appropriate position for use.
Figure 2:
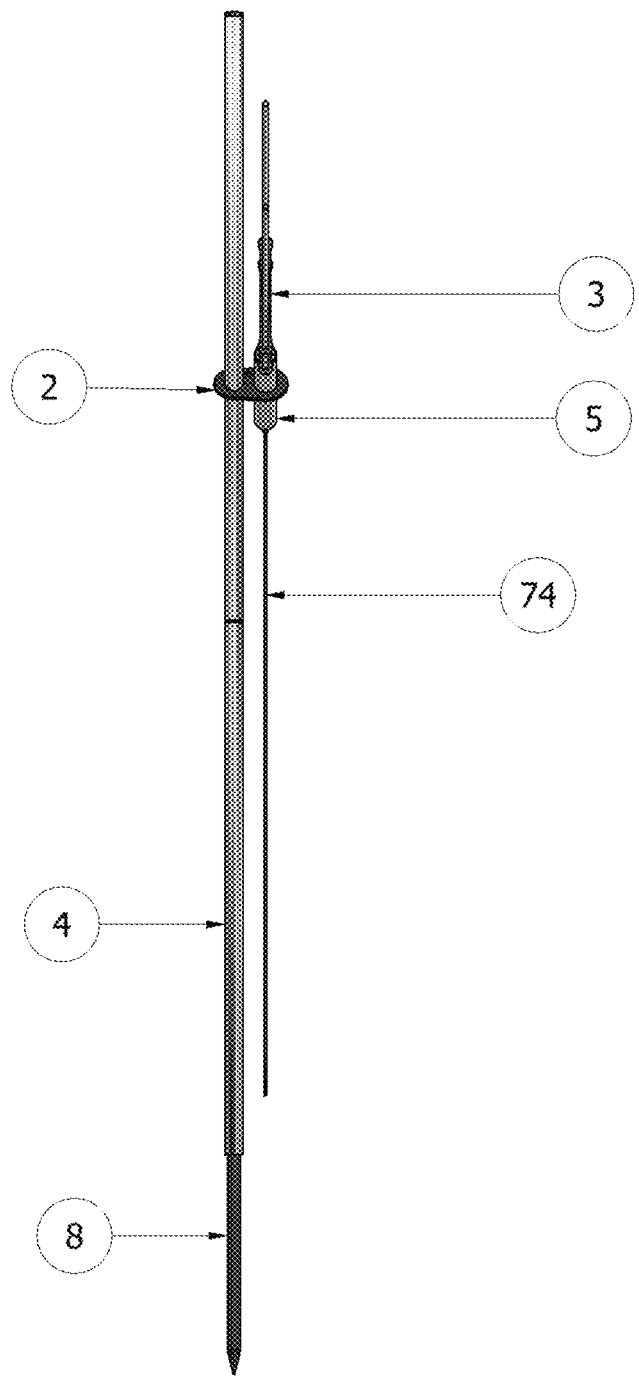
FIG. 2 corresponds to a side view of the demountable electric rotating spit grill (1) of the present invention, when assembled, or in a position ready for use.
Figure 3:
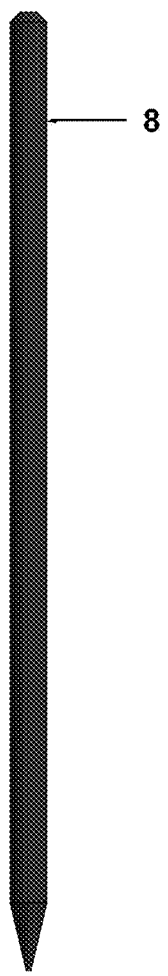
FIG. 3 corresponds to a side view of the stake (8) located in the lower part (14) of the central pillar (4), which conforms the demountable electric rotating spit grill (1).
Figure 4:
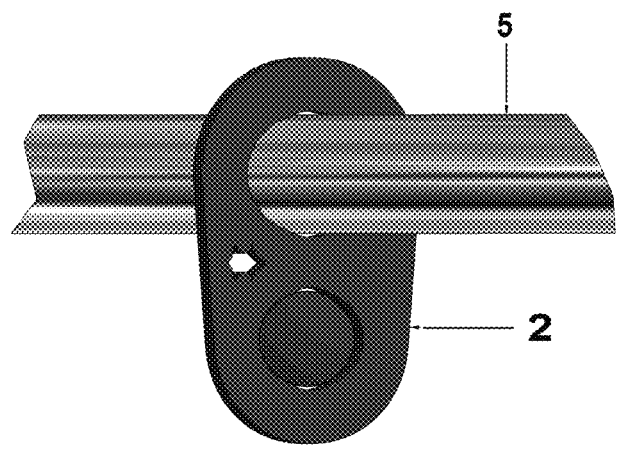
FIG. 4 shows an enlarged view of the fixing means (2) consisting in a sole piece with a particular shape (like an infinite symbol).
Figure 5:
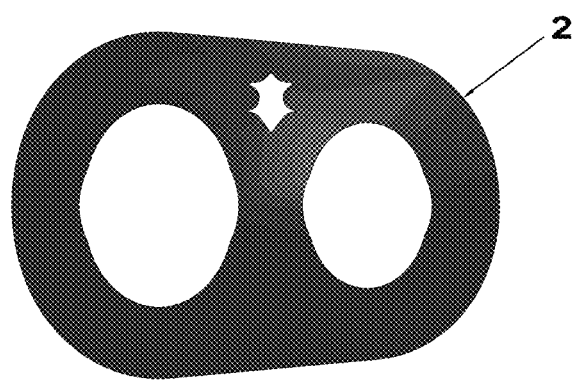
FIGS. 5 and 6 show two different views of the fixing means (2) of the present invention.
Figure 6:
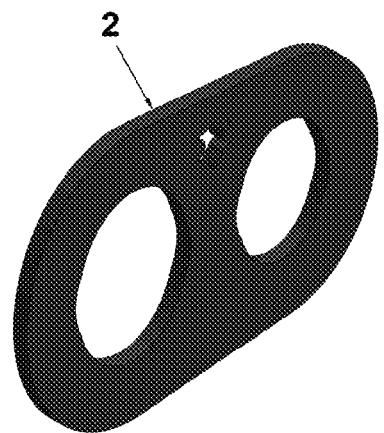
Figure 7:
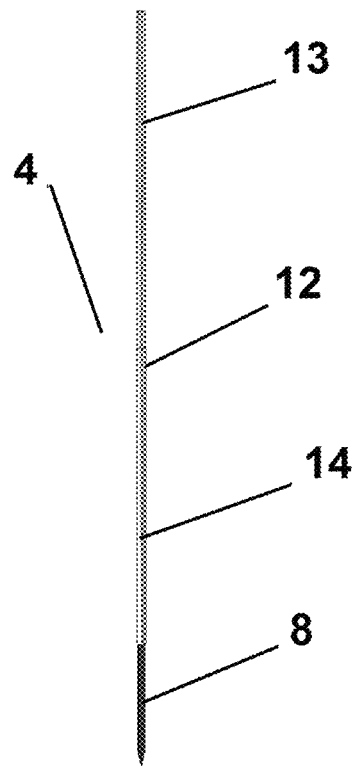
FIG. 7 shows a view of the central pillar (4), of the demountable electric rotating spit grill (1) indicating its parts.
Figure 8:
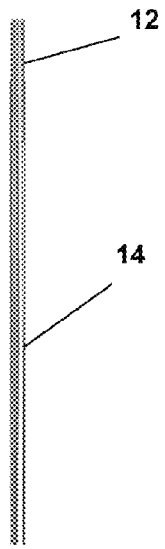
FIG. 8 shows the lower part (14) of the central pillar (4) with its connecting portion (12).
Figure 9:
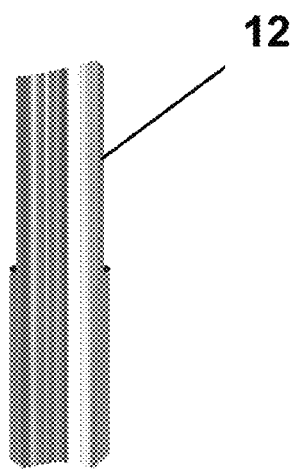
FIG. 9 shows an enlarged sectional view of FIG. 9 that shows the connecting portion (12) of the lower part (4) of said central pillar (4).
Figure 10:
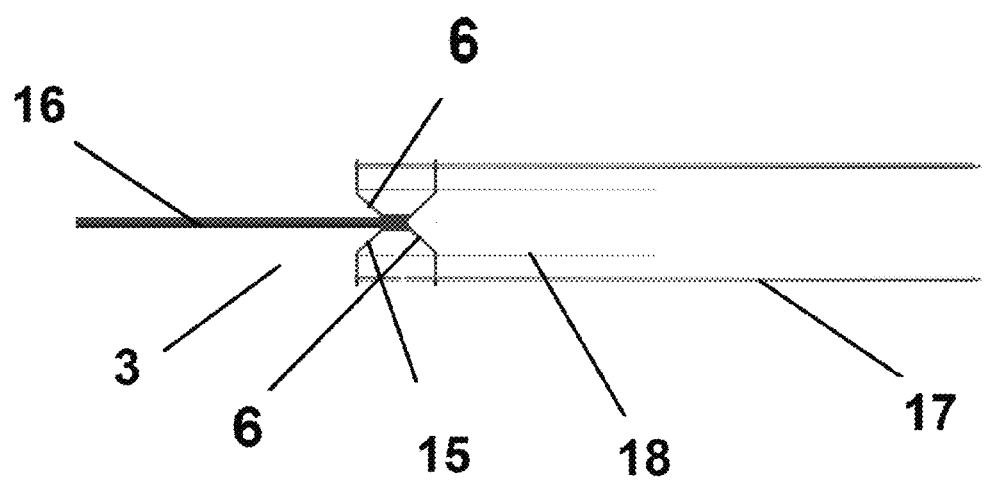
FIG. 10 shows an upper view of the piece 3, formed by a plurality of prongs (17, 18) with free ends disposed in parallel by means of an X shaped piece (15) which is formed by the union of two half-octagon-shaped pieces (6) inversely welded at the end of the coupling bar (16).
Figures 11, 12:
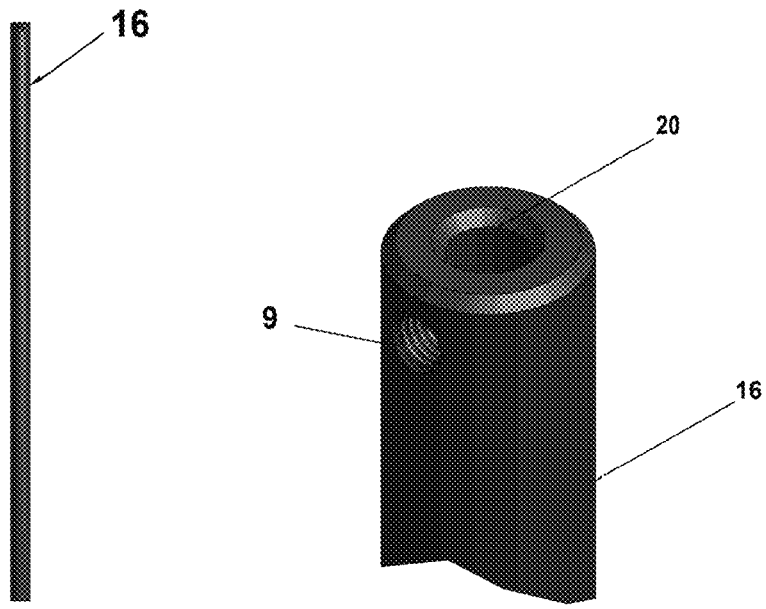
FIG. 11 shows a view of the coupling bar (16).
FIG. 12 shows an enlarged view of the upper part of the coupling bar (16) of FIG. 11 with its orifices through which said coupling bar connects with the motor (20) and it is locked by a prisoner screw (9).
Figure 13:
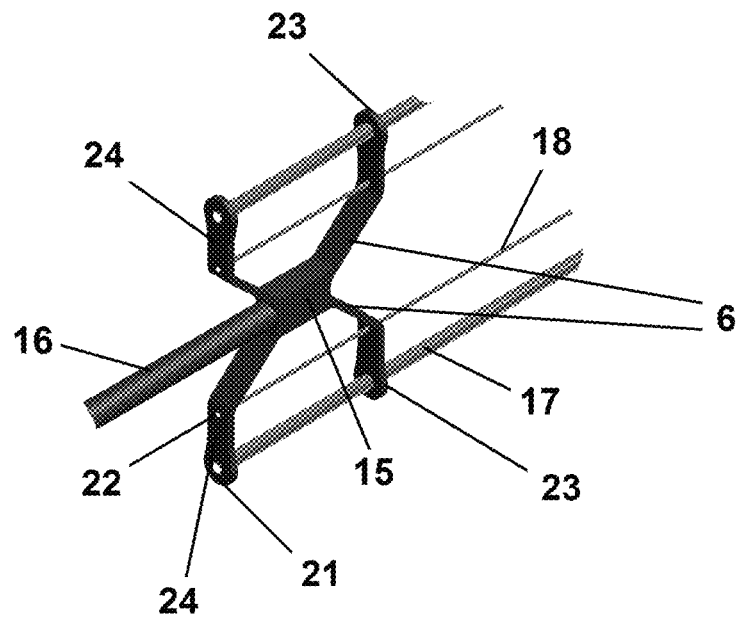
FIG. 13 shows a view of the X shaped piece (15) which is formed by the union of two half-octagon-shaped pieces (6) inversely joined at the end of the coupling bar (16), which has two hollows which are located at the two free ends (23, 24) of each half-octagon piece (6), and the hole (21) of each end (23) has an opening that allows the passage of each prong while the hole (21) of each end (24) has an opening that has female threads (not shown) that allows prongs to be easily screwed to said hole at each end (24).
Figure 14:
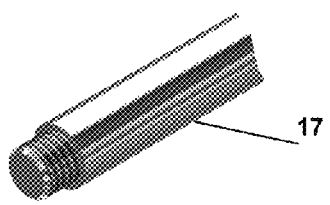
FIGS. 14 and 15 show a close-up of the two ends of one of the prongs, the male thread in one end (FIG. 14) and the peak in the other end (FIG. 15).
Figure 15:
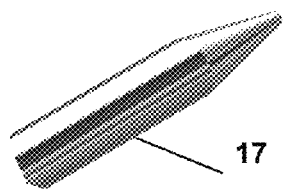
Figure 16:
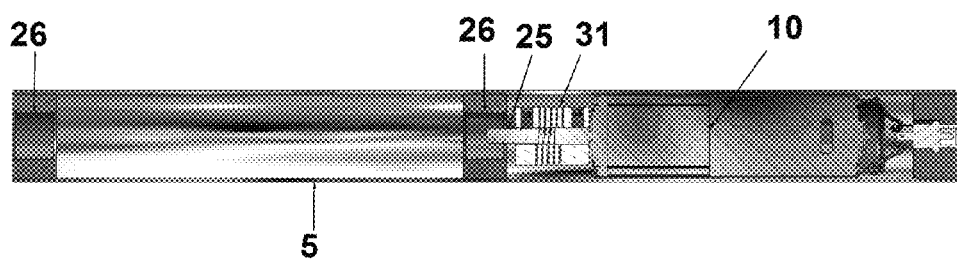
FIG. 16 represents a cross-section view of the holder arm (5) containing inside the geared motor (10) and the related elements: a hexagonal male bar (25) which enters into the coupling bar (16) through its first cylindrical perforation (20) and said hexagonal male bar (25) is connected in line to the geared motor (10) through a flexible connector (31), which has helicoids surrounding said hexagonal male bar (25). Two identical hollow sharpened bushings (26), are also shown, one outer in the end of the holder arm, and the other inner alongside to the hexagonal male bar (25).

The demountable electric rotating spit grill (1) of the present invention comprises a central pillar (4) which is a hollow tube having two parts, one upper part (13) and one lower part (14) that contains a connecting portion (12) that allows joining together both, the upper part (13) and the lower part.

The central pillar (4) is fixed to a holder arm (5) by a novel and useful fixing means (2) consisting in a sole piece with a particular shape.

This important technical features of the invention consists in a sole piece with a particular shape (2) similar to an infinite symbol, which contains two central in line elliptical perforations of different diameters, one corresponding to the diameter of the central pillar (4) and the other one corresponding to the diameter the holder arm (5), both elliptical perforations containing an about 1 mm gap in both ends of their minor axis and through which the central pillar (4) and the holder arm (5) are fixed generating an specific angle between them. This sole piece with a particular shape (2) which has the function of joining together the central pillar and holder arm tubes allowing the present invention to stay firmly attached by the only means of this piece when assembled and in use In a more particular embodiment of this fixing means, it is a sole piece of an area of 4364.3 mm² and 4 mm thick, which is the minimum volume required to support the weight limit up to 10 kg or 20 pounds. Over this weight, this piece will collapse, thus protecting the motor from being loaded with excessive weight (over the specific instructions for use).

Said fixing means has 2 aligned elliptical perforations in its central part, one of smaller diameter of (about 27.40 mm), which is configured to receive the central pillar (4), and the other of larger diameter (about 33.76 mm) to receive the holder arm (5). In both elliptical perforations, the diameters are 2 mm more than each of the respective tubes, so that a gap of 1 mm between the tubes and the piece allows the system to be adjusted in height and depth effortlessly when mounted and in use.

The length of the ellipses in this piece is 34.82 mm in the case of the smallest one, and 42.77 mm in the case of the largest one. This size difference between both perforations generates a 106 degrees angle between the holder arm (5) and the central pillar (4), which allows the prongs with the foods to remain inclined 16 degrees upwards (versus a horizontal position) thus avoiding that the system disconnects itself (the piece (3) containing a coupling bar (16) connected to the holder arm (5) which contains the geared motor 10) and avoiding at the same time that the food to fall.

The oval shape and the perimeter of the respective ellipses is essential for allowing to increase the contact surface between the piece and the tubes fixed through it, helping to distribute the weight and to decrease (to absorb) pressure in comparison of having one single point of contact (for instance, if instead of holes the piece had squares).

Thanks to this only one piece, when assembled, the system remains securely connected, firm, locked only by gravity (torque generated by the weight of the pieces and food) and centered, with the possibility of being adjusted in height and depth, making the whole system easy to adapt to any source of fire or heat (to any conventional grill, etc.).

On the other hand, the holder arm (5), which is coupled to at least one prong holding the food or meat to be cooked is inserted through the coupling bar (16), contains inside a geared motor (10) which allows the prong(s) to rotate over its own axis. The energy can be supplied through an external feeding based on a 12 Volts adapter, AA batteries, or any source of electric energy (74).

Said coupling bar (16) contains a magnet placed inside of its end that form the piece (3), for making easy the connection inside of the holder arm (5) with the hexagonal male bar (25), which in turns connects to the geared motor (10). This configuration "in line" (concentric in respect to the tube that contains them) of the elements that form part of the electric rotating spit grill (1), allows that all of them function perfect and operatively interconnected.

From the inventor knowledge, the invention provides the first electric spit that works in a way that its main parts, i.e. the geared motor (10) and its relates parts, as well as the piece (3) having prongs where meat is inserted are located in only one axis ("in line") one in respect to the other, and at the same time, with a loose end supported only in the central pillar (4) by the particular inventive fixing means consisting in a sole piece with a particular shape (2).

This new configuration avoids the geared motor (10) to lose power or torque due to its direct energy transmission features (direct drive motor) and thus it is possible making the product more compact (less pieces and smaller geared motor), with no sacrifice of torque needed for the food to rotate appropriately.

At the same time, another important advantage of the present invention, is that said "in line" configuration protects the geared motor (10), which is a sensible piece, from the blows, dust or heat from the fire.

The length of 325 mm is the minimum length for the holder arm (5) needed for supporting the complete weight specified for the system when loaded with food.

Figure 19:
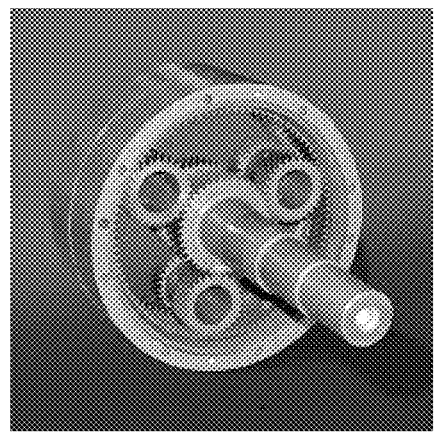
FIG. 19 is a photograph of the geared motor (10) included inside of the holder arm (5).

In a preferred embodiment of the present invention, the high torque geared motor (10) has a planetary gear system for higher strength/resistance (FIG. 19).

Figure 17:
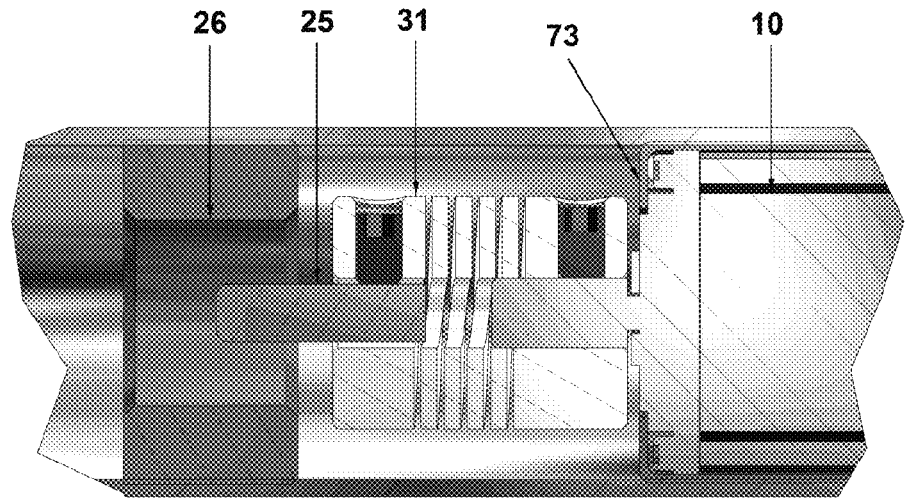
FIGS. 17 and 18 show close-ups of two interior sections of the holder arm (5) according FIG. 16.

Further, FIG. 17 shows the two bushings (26) included in the holder arm (5) having a sharpened edge on the inside front part which facilitates the entrance of the coupling bar (16) and allows it to be guided toward the center of the tube and to be connected through its first cylindrical perforation (20) with the male hexagonal bar (25).

The flexible connector (31) has the function of absorbing differences in angle between the piece (3) and the geared motor (10), regardless of any difference in both slopes, specifically between the piece (3) and the hexagonal male bar (25) that could be generated due to production variations. Thus, the connector (31) having helicoids surrounding the hexagonal male bar (25), allows realign the said piece (3) and the geared motor (10), permitting the last gives all the required force with no overwork, and consequently decreasing the power consumption. The helicoids, at the same time work as shock absorbers, thus muffling the shocks in other they do not reach the motor (10). Furthermore, the geared motor (10) inside the holder arm (5) is also surrounded of an insulating element (73) that protects it from high temperatures and, at the same time, moderates the noise produced by such motor.

Figure 18:
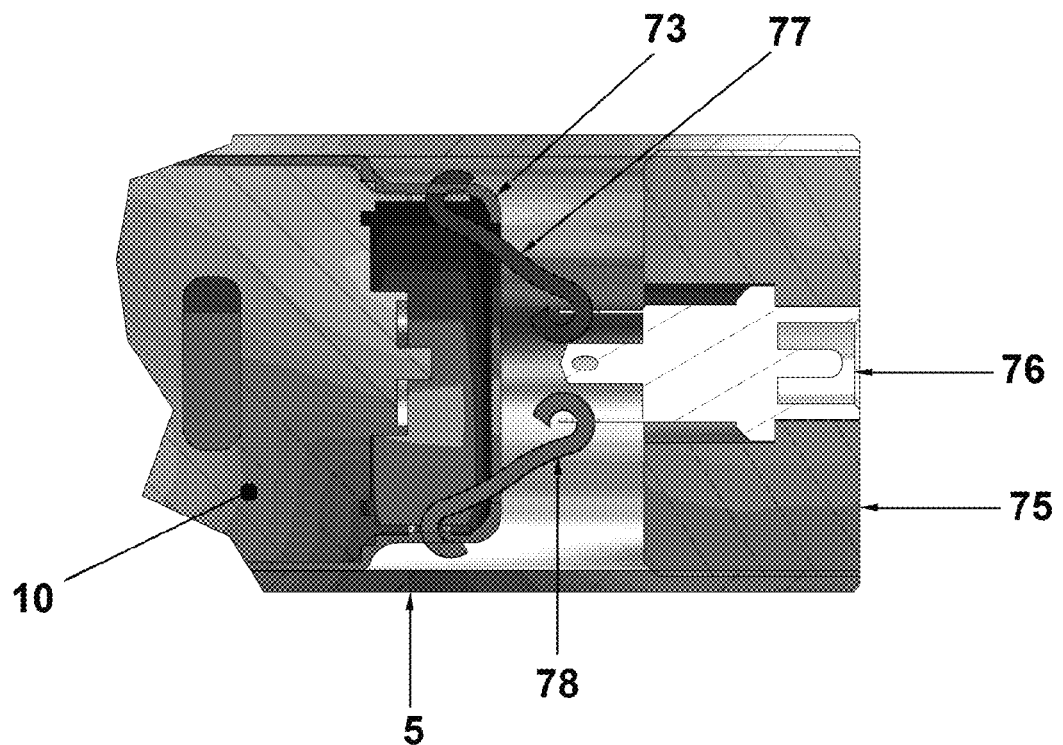

In FIG. 18, which is a close-up of the other end of the geared motor (10), shows the insulating element (73) and the female DC jack connector (76) which is placed at the center of one bushing (75) that has male threads onto which the female connector (76) is screwed. This set, composed by the female jack connector (76) and the bushing (75), it is placed (by pressure) inside the tube, sealing the holder arm (5).

Furthermore, inside the holder arm (5) more elements are found, such as a first copper cable (77), a second cable (78), those that directly connect the motor with the female connector jack DC (76) to the external energy output/source.

All the elements/parts, located inside of the holder arm (5) stay in their corresponding position due to the strong connection established among them by the placement by pressure of the components inside the holder arm (5), allowing the elimination of separators, or other external fastening elements, such as bolts or screws, which could add complexity and unnecessary weight to the electric spit.

The invention claimed is:

1. An apparatus for grilling food, which comprises:
   a central pillar;
   a holder arm fixed to the central pillar by a fixing means consisting in a sole piece which contains two in line perforations of different diameters;
   a piece containing a coupling bar connected to the holder arm and having at the opposite end at least one prong;
   a geared motor included inside of the holder arm, which also contains all its related elements located in line one in respect to the other; and an electric energy source operatively connected to the geared motor of the holder arm.

2. The apparatus according to claim 1, wherein the central pillar is a hollow tube having two parts, one upper part and one lower part, said lower part that is mounted inside the upper part through a connecting portion.

3. The apparatus according to claim 1, wherein the piece has a plurality of prongs with free ends disposed in parallel by means of an X shaped piece which is formed by the union of two half-octagon-shaped pieces inversely joined at the end of the coupling bar.

4. The apparatus according to claim 3, wherein the piece holds four parallel cylindrical prongs, of which the two nearest are smaller in diameter and size than the two located more distantly located.

5. The apparatus according to claim 3, wherein the prongs have a male thread at the opposite end of their picks.

6. The apparatus according to claim 3, wherein the prongs are fixed to the X shaped piece through two hollows which are located at the two free ends of each half-octagon piece, and the hole of each end has an opening that allows the passage of each prong while the hole of each end has an opening that has female threads onto which the prongs are screwed.

7. The apparatus according to claim 1, wherein the fixing means consisting in a sole piece have a configuration similar to an infinity symbol, which contains two central in line elliptical perforations of different diameters, one corresponding to the diameter of the central pillar and the other one corresponding to the diameter the holder arm, both elliptical perforations containing an about 1 mm gap in both ends of their minor axis and through which the central pillar and the holder arm are fixed with a specific angle between them.

8. The apparatus according to claim 1, wherein the coupling bar connected to the holder arm has in one of its ends a first cylindrical perforation including a magnet, and a second perforation which is placed perpendicularly with respect to the first cylindrical perforation and including a prisoner screw, while in the opposite end said coupling bar has soldered an X shaped piece.

9. The apparatus according to claim 1, wherein the holder arm comprises inside a hexagonal male bar which enters into the coupling bar through its first cylindrical perforation.

10. The apparatus according to claim 9, wherein the hexagonal male bar is connected in line to the geared motor through a flexible connector, which has helicoids surrounding said hexagonal male bar.

11. The apparatus according to claim 1, wherein the holder arm comprises two identical hollow sharpened bushings, one outer in the end of the holder arm, and the other inner alongside to a hexagonal male bar.

12. The apparatus according to claim 1, wherein the geared motor in the holder arm is surrounded by an insulating element, and is operatively connected to the energy source through a female Jack DC connector and two copper cables.

13. The apparatus according to claim 12, wherein the energy source is selected from the group consisting of a set of alkaline batteries, a car battery, a solar panel and a domestic electrical network.

* * * * *